(12) United States Patent
Zhang et al.

(10) Patent No.: US 8,942,959 B2
(45) Date of Patent: Jan. 27, 2015

(54) METHOD FOR PREDICTING OUTPUTS OF PHOTOVOLTAIC DEVICES BASED ON TWO-DIMENSIONAL FOURIER ANALYSIS AND SEASONAL AUTO-REGRESSION

(75) Inventors: Weihong Zhang, Sharon, MA (US); Daniel Nikolaev Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 392 days.

(21) Appl. No.: 13/434,125

(22) Filed: Mar. 29, 2012

(65) Prior Publication Data

US 2013/0262049 A1    Oct. 3, 2013

(51) Int. Cl.
*G06F 17/14*    (2006.01)
*G01W 1/10*    (2006.01)

(52) U.S. Cl.
CPC ............... *G06F 17/141* (2013.01); *G01W 1/10* (2013.01); *Y02E 10/566* (2013.01)
USPC .......................................................... 703/2

(58) Field of Classification Search
None
See application file for complete search history.

(56) References Cited

U.S. PATENT DOCUMENTS

| 7,580,817 | B2 | 8/2009 | Bing | |
| 2013/0054662 | A1* | 2/2013 | Coimbra | 708/230 |
| 2013/0080374 | A1* | 3/2013 | Karlsson | 706/52 |
| 2013/0166266 | A1* | 6/2013 | Herzig et al. | 703/6 |

OTHER PUBLICATIONS

Espinar, B., et al. "Photovoltaic Forecasting: A State of the Art" 5th European PV-Hybrid and Mini-Grid Conference (2010).*
Bien, T. & Musikowski, H.D. "Forecasting Photovoltaic Energy Using a Fourier Series Based Method" 23rd European Photovoltaic Solar Energy Conference, pp. 3088-3091 (2008).*
Reikard, Gordon "Predicting Solar Radiation at High Resolutions: A Comparison of Time Series Forecasts" Solar Energy, vol. 83, pp. 342-349 (2009).*
U. Amato et al. "Markov Processes and Fourier Analysis as a Tool to Describe and Simulate Daily Solar Irradiance," Solar Energy vol. 37, No. 3, pp. 179-194, 1986 Pergamon Journals Ltd.
Richard E. Bird et al. "A Simplified Clear Sky Model for Direct and Diffuse Insolation on Horizontal Surfaces," Feb. 1981; SERI/TR-642-761; Solar Energy Research Institute; US Department of Energy; Feb. 1981.

(Continued)

*Primary Examiner* — Kamini S Shah
*Assistant Examiner* — Jay B Hann
(74) *Attorney, Agent, or Firm* — Dirk Brinkman; Gene Vinokur

(57) ABSTRACT

An output of a photovoltaic (PV) device is predicted by applying Fourier analysis to historical data to obtain frequencies and a mean of the frequencies in the data. Regression analysis is applied to the data to obtain a regression coefficient. Then, the prediction is a sum of the mean at the time step and a deviation from the mean at a previous time step, wherein the means are represented and approximated by selected frequencies, and the deviation for the previous time step is weighted by the regression coefficient.

14 Claims, 2 Drawing Sheets

(56) References Cited

OTHER PUBLICATIONS

Y.-C. Sun, "A Solar Radiation Model with a Fourier Transform Approach," Bioresource Engineering, Mc Gill University, 21,111 Lakeshore Road, Ste. Anne-de-Bellevue, Quebec H9X 3V9 Canada; vol. 49; 2007; pp. 7.17-7.24.

Clifford W. Hansen et al. "Statistical Criteria for Characterizing Irradiance Time Series;" SANDIA Report SAND2010-7314 Unlimited Release Printed Oct. 2012; Prepared by Sandia National Laboratories; Albuquerque, New Mexico 87185 and Livermore, California 94550.

* cited by examiner

METHOD FOR PREDICTING OUTPUTS OF PHOTOVOLTAIC DEVICES BASED ON TWO-DIMENSIONAL FOURIER ANALYSIS AND SEASONAL AUTO-REGRESSION

FIELD OF THE INVENTION

This invention relates generally to predicting an output of a power generator, and more particularly predicting the output of photovoltaic devices using the daily and annual patterns in data series of historical outputs of the devices.

BACKGROUND OF THE INVENTION

The use of renewable energy resources by energy providers is increasing. The estimated grid-connected photovoltaic (PV) capacity increased at an annual average rate of 60% from 2004 to 2009, and is the fastest growing energy generation technology in the world.

Increasing the PV capacity can have a major impact on reducing carbon emissions. Therefore, the use of renewable power resources including PV devices has been encouraged by world governments via taxes and subsidies. However, because the outputs of PV devices and other renewable resources are highly volatile, their increased use can also cause reliability issues.

One approach to managing this unreliability is to use a risk control module so that "blackout" due to volatility can be reduced to an acceptable level.

For a power generation system that also includes fossil burned generators, coal, natural gas, oil, diesel, one strategy to compensate for the volatility and intermittent output of the PV devices is to keep the generators operational in an idle or standby mode, and to supply a demand deficit in the event that PV generation output is suddenly reduced.

However, that strategy can actually increase the emission of greenhouse gases, because it essentially keeps some of the generators operational in certain capacity. This problem becomes more serious and less cost-effective with an increased use of the PV devices, because more and more generators need to be committed, and kept operational.

One way to deal with this problem is to predict total energy demand, and the PV output that is generated. A more accurate prediction yields smaller prediction errors that can be measured by mean absolute percentage error (MAPE), relative absolute error (RAE), mean square error (MSE), or root mean square error (RMSE). The selection of the error measures can significantly impact the selection of the prediction methods.

If the predictions are available, then the amount of the net demand, i.e., the difference between the total demand and the PV output, can be estimated accurately. The difference is then supplied by conventional fossil-burned generators.

The accurate prediction can lead to a control strategy that operates a minimal number of fossil-burning generators to meet unforeseen energy demand. Therefore, the accuracy of the prediction is crucial to cost and pollution reduction.

The prediction for PV generations has to take into account many influencing factors, including daily and annual variations, atmospheric conditions, device hardware parameters, and their complex interactions. This can be understood from the procedures by which the electricity is converted from the solar irradiance.

The PV device generates electrical power by converting solar radiation into electrical power using the photovoltaic effect of semiconductors. The photons in sunlight contain different amounts of energy corresponding to the spectrum of solar rays. PV power generation requires complex steps that depend on irradiance levels, physical conditions impacting semiconductor materials, converter delay coefficients, and short-term atmospheric fluctuations, the weather conditions, etc.

One way to predict the PV device output empirically is to characterize the current solar activity and irradiance levels to determine parameters for a PV model, and use the PV model to predict the potential output. The drawback of that approach is that the models are highly nonlinear in multiple variables, and are difficult to obtain analytically or empirically.

To avoid that drawback, an alternative approach predicts the PV outputs using statistical techniques to analyze their characteristics. The benefit of that approach is that it does not involve the physical details of PV materials, the external atmospheric conditions, and their interactions.

One prior art method uses three statistics, namely the frequency distribution of irradiance that quantifies the fraction of time that irradiance falls within a specified range of values; the distribution of ramps, i.e., changes in level, of irradiance over a period of time; and the autocovariance and autocorrelation in the irradiance time series data.

SUMMARY OF THE INVENTION

The embodiments of the invention provide a method for predicting an output of a photovoltaic device used in a power generation system.

The method predicts the outputs of the PV device based on daily and annual patterns determined from a time series data set of its historical outputs. The method combines two-dimensional Fourier analysis that characterizes a persistent component of PV generations, and a seasonal autoregression technique that accounts for a variational component.

The method is entirely data driven based only on historical records, and does not rely on movement of the sun, external atmospheric conditions, or any other external or internal device parameters.

The rationale behind such a data-driven method is that the influences of the aforementioned parameters on the PV outputs are nonlinear, and therefore are rarely practical to be modeled in an analytical form. Instead, the time series data of PV generations is considered a natural and ultimate reflection of the complex interactions of the parameters, and their influences.

DETAILED DESCRIPTION OF THE PREFERRED EMBODIMENTS

Figure 1:
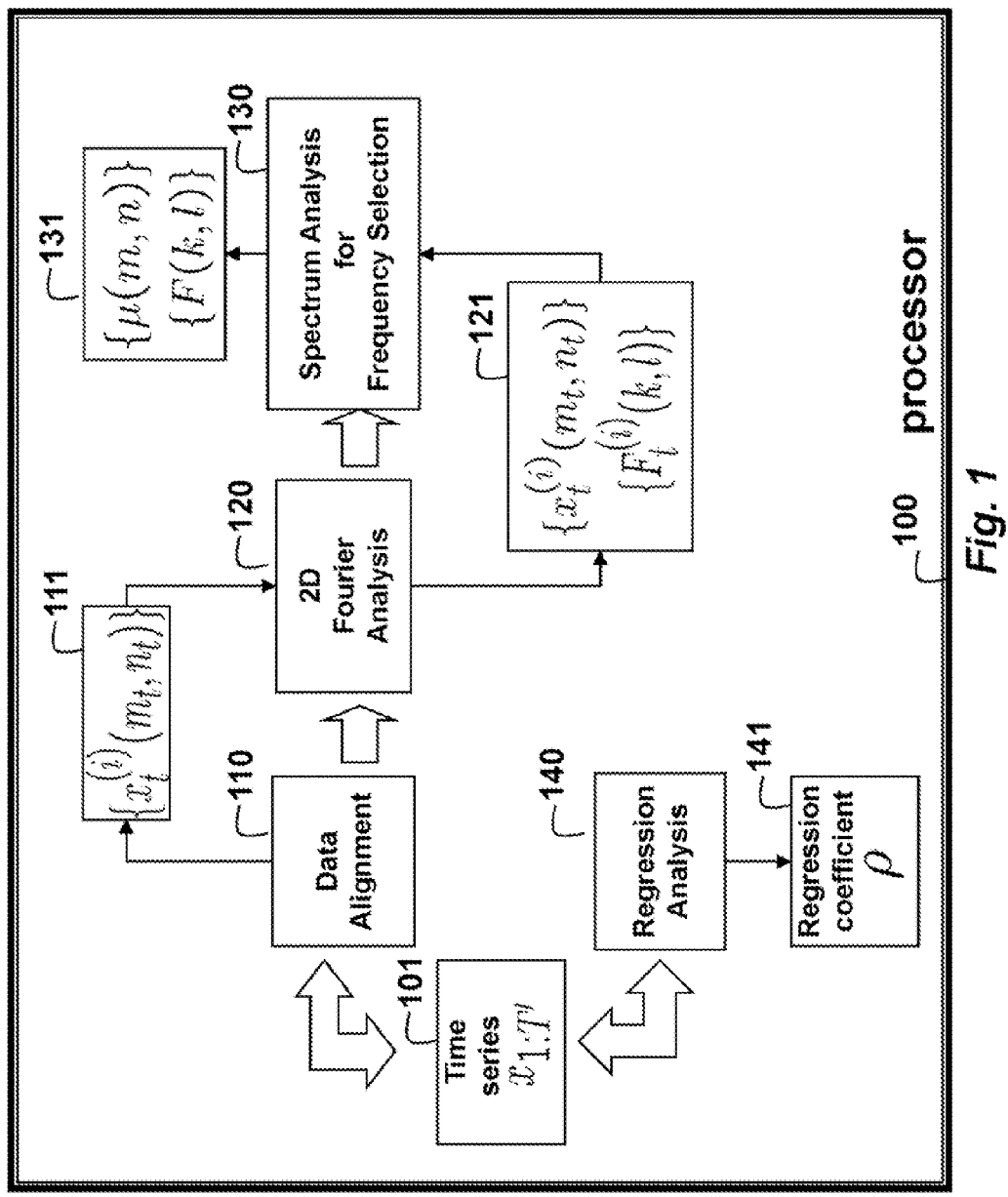
FIG. 1 is a flow diagram of a method for determining parameters to be used for PV power prediction according to embodiments of the invention.

As shown in FIG. 1, the embodiments of our invention provide a method for predicting an output of a photovoltaic (PV) device. The method operates on historical time series data 101.

Statistics of the time series data represents contributions of spectrum frequencies to PV generations. Frequencies 121 of the time series data are obtained by a Fourier analysis 120.

The Fourier analysis explicitly takes into account daily and annual variations in the time series data. Therefore, the data are aligned 110 two-dimensionally (2D) according to the days in a year and hours in a day, and Fourier transformed frequencies are obtained.

The 2D Fourier analysis reveals how frequencies in daily and annual variations impact the PV generations in a quantitative manner.

Furthermore, by using spectrum analysis 130 on the Fourier transformed data, we determine the frequencies 131 that substantially contribute to the output of the PV device.

Thus, the dominating frequencies are selected to represent the statistics of the historical time series data. By ignoring frequencies that contribute less, the statistics can be used as approximation of the data. Because the frequencies are transformed from historic time series data, the frequencies can represent the PV power generations and establish their underlying persistence over time. Our method incorporates the persistence of the frequencies in the predicting.

Our prediction method also includes a component that characterizes the variations of the PV generations over time. The variation during some arbitrary time step, now or in the future, largely depends on a previous time step. For example, a current cloudy condition largely depends on that of one hour ago. Therefore, the variation of the PV generations caused by the atmospheric condition is correlated to the variation caused by the same condition during the previous time step.

The importance of the correlation in the predictor can be regulated by a regression coefficient $\rho$ 141 obtained by regression analysis 140.

Figure 2:
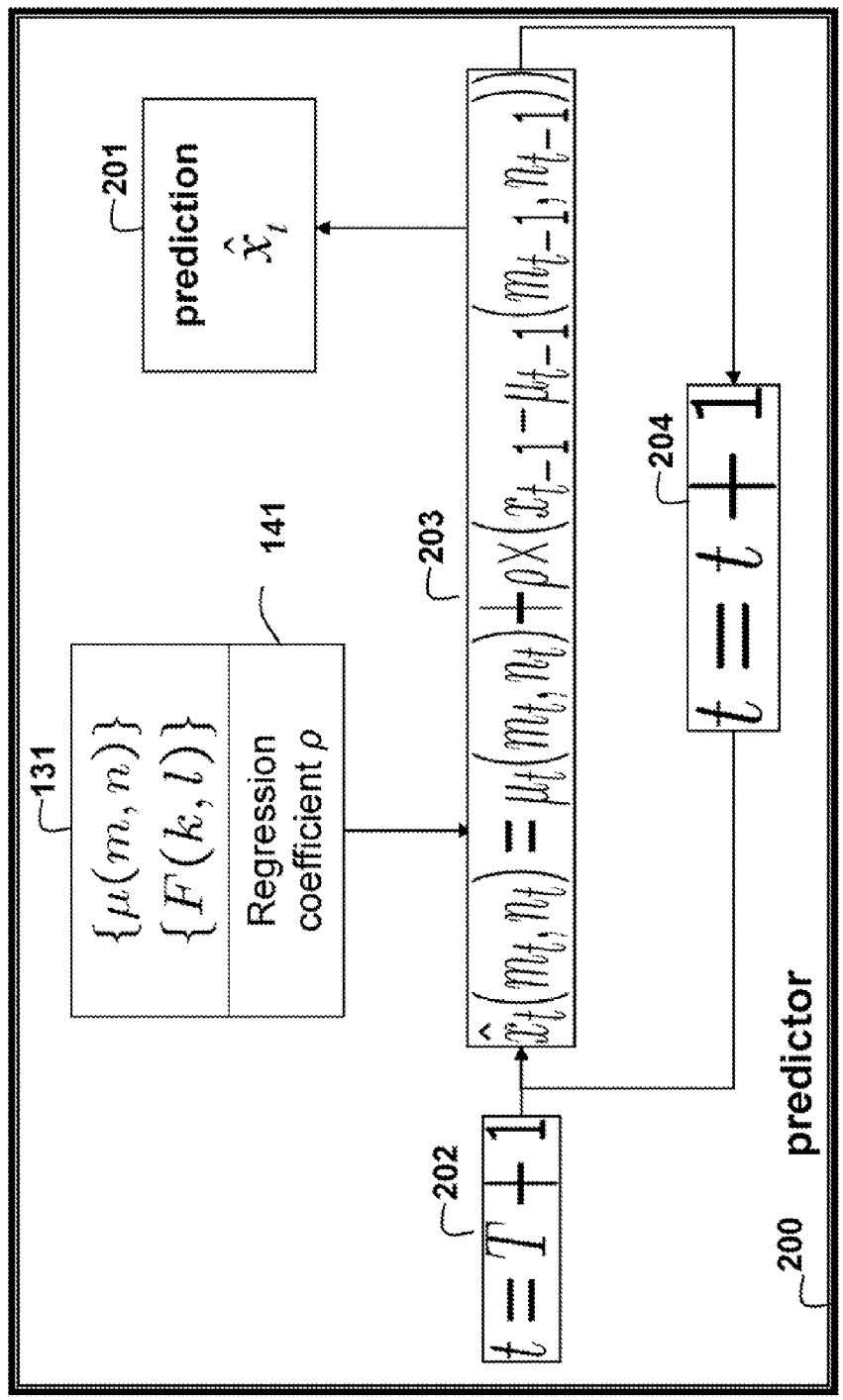
FIG. 2 is a flow diagram of a method for predicting an output of a photovoltaic device according to embodiments of the invention.

FIG. 2 shows the predictor 200 that uses the outputs 131 and 141 of the Fourier and regression analysis. The predictor estimates the PV generation output $\hat{x}_t$ 201 at the arbitrary time step 203, now or in the future, as a sum of the PV output related to the most contributing frequencies at the current step, and the variation from the previous time step weighted by a regression coefficient.

The predicting method accounts for the persistent aspect of the PV generation from the historic data and the variational aspect in a dynamical manner. The predicting method considers daily and annual patterns in the time series data.

The steps shown in FIGS. 1-2 can be performed in a processor 100 connected to memory, and input/output interfaces as known in the art. All the variables shown in the figures are described in detail herein.

Details

The time series data 101 is $x_{1:T'} = \{x_1, x_2, \ldots, x_{T'}\}$, where T' is the maximal number of available data entries, and $x_t$ denotes the PV output at a current time t on a regular basis, e.g., by minute, hour, day, or other time interval. The goal is to predict 203 the PV output $\hat{x}_t$ 201 at the time step t now, or in the future. The prediction iterates over time: at time step t>T'+1 202, predict $x_t$ given the PV outputs up to the previous step t-1, i.e., the time series $x_{1:t-1}$.

In our formulation, the output $x_t$ at time t can be estimated from the outputs at a finer time scale. For instance, if the outputs of the PV device are collected by minute, then the hourly output $x_t$ can be the sum of the outputs over all minutes within an hour.

The time series 101 can be converted into other series in different time scales such as one day, one year, or an interval selected for a specific application.

2D Fourier Analysis

We use T to denote the number of hours in an interval, e.g., 24 for one calendar day or 8760 (=24×365) for one non-leap year. The subseries $x_{1:T}$ is a discrete function from 1:T. Due to the existence of the patterns in the time series $x_{1:T}$, the Fourier analysis 120 can decompose the pattern into a sum of a set of sine and cosine functions.

A base frequency is $$\frac{2\pi}{T}.$$

The time series $x_{1:T}$ within the time interval can be represented as $$x_t = \frac{a_0}{2} + \sum_{n=1}^{T} \left[ a_n \cos\left(\frac{2\pi n t}{T}\right) + b_n \sin\left(\frac{2\pi n t}{T}\right) \right], \quad (1)$$

$$n = 0, \ldots, T-1,$$

where the term $$a_n \cos\left(\frac{2\pi n t}{T}\right) + b_n \sin\left(\frac{2\pi n t}{T}\right)$$

is the $n^{th}$ harmonic, and the coefficients $(a_i, b_i)$ are the $n^{th}$ harmonics coefficients calculated as $$a_n = \frac{2\pi}{T} \sum_{n=1}^{T} x_t \cos\left(\frac{2\pi n t}{T}\right),$$

and $$b_n = \frac{2\pi}{T} \sum_{n=1}^{T} x_t \sin\left(\frac{2\pi n t}{T}\right).$$

The Fourier analysis above is one dimensional because it uses one variable t to represent time step. Such a Fourier series can represent either the daily pattern or the annual pattern of PV generations depending on the chosen periodicity, but no both.

A two-dimensional (2D) Fourier analysis can represent both the daily patterns and the annual patterns in the historical PV generations. This is important because both patterns exist in the time series of PV generations and the analysis tool should use both.

The time series of PV generations exhibits the daily pattern and the annual pattern because solar irradiance is the energy source of PV systems and the irradiance exhibits two patterns.

The amount of solar irradiance available at the device location determines the maximal PV generations. However, the solar irradiance in a geolocation varies from time to time due to the constant changes of the positions of the sun relative to the Earth. The daily time series usually starts from a zero output before sun rise; increases to the maximum around noon, and decreases gradually to zero output after sunset. In a yearly data series for temperate latitudes, the PV device generates more electricity in the summer than in the winter. Moreover, the generations in spring and fall should lie in between.

In 2D Fourier analysis, a time step t∈1:T is associated with a pair $(m_t, n_t)$ where $m_t$ denotes the calendar day of t within a year, and $n_t$ the hour of the day. Hence, $m_t$ ranges from 1 to M that is 365 in days in a non-leap year, and 366 otherwise, while $n_t$ ranges from 1 to N, that is 24 hours in a day. The time series $x_{1:T'}$ can be interpreted as a discrete function that has two variables, namely the day within the year and the hour within one day. For example, January 31 at 7 a.m. is represented as a pair (31, 7).

The data $x_{1:T'}$ can be aligned 110 in two dimensions. It is possible that the data contain data records in a partial year. In that case, we use only data in the entire year. Assume that the data $x_{1:T'}$ spans I years.

The data $x_{1:T'}$ can be partitioned to I data subseries $$\{x^{(i)} = x_{(i-1) \times M \times N + 1 : i \times M \times N} | i = 1:I\}.$$

The notation $x^{(i)}$ denotes the subseries data of $x_{1:T'}$ for the $i^{th}$ year. The data alignment 110 facilitates our subsequent analysis.

In the matrix form, the data are $$\begin{bmatrix} x^{(1)} \\ x^{(2)} \\ \dots \\ x^{(I)} \end{bmatrix} = \begin{bmatrix} x_1 & x_2 & \dots & x_{MN} \\ x_{MN+1} & x_{MN+2} & \dots & x_{2MN} \\ \dots & \dots & \dots & \dots \\ x_{(I-1)MN+1} & x_{(I-1)MN+2} & \dots & x_{IMN} \end{bmatrix}.$$

The subseries $x^{(i)}$ of the time series for the $i^{th}$ year, can be approximated by the two-dimensional Fourier series within the daily and annual interval:

$$x_t^i(m_t, n_t) = \frac{1}{\sqrt{M \times N}} \sum_{l=0}^{N-1} \sum_{k=0}^{M-1} F_t^{(i)}(k, l) e^{j 2\pi \left(\frac{mk}{M} + \frac{nl}{N}\right)}. \quad (2)$$

In the expressions, j is an imaginary unit, e.g., $$j = \sqrt{-1}, 0 \le m, k \le M-1, \text{ and } 0 \le n, l \le N-1.$$

The Fourier coefficients $F_t^{(i)}(k,l)$, calculated in Equation 3, are the discrete spectrum of $x_t^{(i)}(m_t, n_t)$ in two dimensions. Both $f_t^{(i)}(m_t, n_t)$ and $F_t^{(i)}(k,l)$ can be considered as elements of two M×N matrices x and F. The coefficients $F_t^{(i)}(k,l)$ are related to the data series as follows.

$$F_t^{(i)}(k, l) = \frac{1}{\sqrt{M \times N}} \sum_{n=0}^{N-1} \sum_{m=0}^{M-1} x_t^{(i)}(m, n) e^{-j 2\pi \left(\frac{mk}{M} + \frac{nl}{N}\right)}. \quad (3)$$

Equations 2 and 3 indicate that the 2D Fourier representation of the time series contains cross items over the hours in a day and the days in a year. These cross items depict the correlation between the two time patterns.

However, in a one-dimensional analysis, the correlation cannot be modeled. For example, if k denotes a sunny day and l denotes noon, then the magnitude of $F_t^{(i)}(k,l)$ is expected to be larger than the counterpart when k denotes a winter day and l denotes noon. The reason is that at noon, there is more sunlight in the summer, which results in greater PV generation output. The one dimensional Fourier analysis does not distinguish hours of different days of the year.

For the time series $x_t^{(i)}(m_t, n_t)$, we could select the numbers M and N such that $x_t^{(i)}(m_t, n_t)$ can be approximated by the Fourier series to any given precision. In signal processing, this is equivalent to increasing the number of samples. When M and N are sufficiently large, the Fourier series can faithfully represent the series $x_t^{(i)}$ of PV generations without loss.

However, such a faithful series is biased toward the given data $x_t^{(i)}(m_t, n_t)$. The Fourier coefficients obtained from $x_t^{(i)}(m_t, n_t)$ can perfectly represent the series for one year, but cannot represent the PV outputs for all situations now and in the future.

To alleviate the bias and make the Fourier coefficient more representative, for a pair (k,l), we compute the mean of the Fourier coefficients F(k,l) in the data collected over years, i.e., $$F(k, l) = \frac{\sum_{i=1}^{I} F_t^{(i)}(k, l)}{I}. \quad (4)$$

F(k,l) is the average of the Fourier coefficient over several years, therefore independent of the individual years. If we replace the Fourier coefficients in Equation 2 with the "averages" in Equation 4, then we have the "average" PV output. The average output is biased to a lesser degree because the averaging smoothes out variations in individual years.

Our Fourier analysis and regression analysis are performed over the historical time series data of PV outputs in the hope that the original series preserves statistical persistence.

We have chosen to work with the input time series 101 of PV generations in Fourier analysis. In general, depending on the purposes of data analysis, we can choose to work with other input series, or the series transformed from the input series, as long as these series exhibit more regularities statistically. For example, a Gaussian error function can be used to turn the stochastic component of the series of solar irradiance to a series of data with normal distributions of a zero mean and unit standard deviation.

Another series is the series of $K_T$ ratios that are obtained by dividing the daily solar irradiance on a horizontal plane by extra-atmospheric irradiance. The distribution of the $K_T$ ratios is independent of season and locality.

Similarly, a clearness index is defined as a series of the ratios between irradiance at the earth's surface and the irradiance expected for clear sky conditions. A clearness index permits comparison of irradiance measurements at different times and on different calendar days.

Above, we have been considering the Fourier coefficients for all M×N frequencies. In some cases, this is necessary because the time series of PV output is essentially aperiodic. From a theoretical point of view, to arbitrarily approximate the aperiodic function, the Fourier series needs an infinite number of frequencies and harmonic terms. However, in practice, keeping infinite frequencies is infeasible. Even retaining a large number of frequencies increases memory requirements and computational loads.

Frequency Selection

Hence, appropriate frequency selection 130 is important in ensuring the precision and computation balance. The frequency selection process determines the dominating frequencies that substantially contribute to PV generations. Furthermore, this process can lead to a subset of frequencies, and thus a computational advantage in the subsequent steps, because the dormant frequencies are not used due to their moderate contribution to the PV output.

Our method employs the average Fourier coefficients F(k, l) for the frequency selection. The complex weight of F(k,l) can be represented in polar form as $$F(k,l) = F_r(k,l) + j F_i(k,l) = |F(k,l)| e^{j \angle F(k,l)}$$

in terms of its amplitude $|F(k,l)|$ and phase $\angle F(k,l)$, where $F_r(k,l)$ and $F_i(k,l)$ are the real and imaginary part of the coefficient F(k,l), the amplitude $|F(k,l)| = \sqrt{F_r^2(k,l) + F_i^2(k,l)}$, and the phase $$\angle F(k, l) = \tan^{-1}\left[\frac{F_i(k, l)}{F_r(k, l)}\right].$$

In this representation, the amplitude quantifies the influences of the frequencies on the PV generations. Therefore, the frequencies with the largest amplitudes are selected because otherwise the frequencies would contribute less to the value of the time series at a particular time step.

The set of selected frequencies is denoted by $\tau(1:M\times1:N)$. With the subset of frequencies, the Fourier representation of the time series of PV generations and their Fourier coefficients are given in Equation 5 and 6. Equations 5 and 6 are similar to Equations 2 and 3, but with substitution of the full spectrum of frequencies $1:M\times1:N$ by the selected frequencies $$\tau(1:M\times1:N)$$
$$\mu(m,n) = \frac{1}{\sqrt{M\times N}} \sum_{(l,k)\in\tau(1:M\times1:N)} F_t^{(i)}(k,l)e^{j2\pi\left(\frac{mk}{M}+\frac{nl}{N}\right)}, \quad (5)$$

and $$F(k,l) = \frac{1}{\sqrt{M\times N}} \sum_{(n,m)\in\tau(1:M\times1:N)} x(m,n)e^{-j2\pi\left(\frac{mk}{M}+\frac{nl}{N}\right)}. \quad (6)$$

Two methods can determine the number of frequencies to select. The first method selects a predetermined number of the frequencies with the largest magnitudes. The second method determines the number of the selected frequencies adaptively. For a given preset ratio p, the number k is selected so that the ratio exceeds p between the sum of the amplitudes of the selected frequencies and that of the amplitudes of all frequencies. In other words, $$\frac{\sum_{k',l'} |F(k',l')|}{\sum_{(k,l)} |F(k,l)|} \geq p,$$

where k' and l' represent selected frequencies, and k and l represent all available frequencies.

Our method uses the Fourier coefficients $F(k,l)$ and the mean $\mu(m_t,n_t)$ to represent a trend in the PV time series. The trend is the pattern that characterizes the PV output. In trend representation, our method is more general than prior art methods, where trends are mostly represented by the various central moments and normalized moments of the PV series at different orders. The most common ones are the means and the variances that describe the extent to which the actual PV generations fluctuate around the mean PV output.

Our method is related to conventional methods as follows. If the selected frequencies and their Fourier series can exactly represent the real mean of the PV generations, then the means $\mu(m_t,n_t)$ degenerate to the real mean. In this case, the method takes the mean of the historical data at a time $(m_t,n_t)$ as the persistent component when predicting.

Seasonal Auto Regression (SAR)

One prior art prediction method uses the mean $\mu(m_t,n_t)$ to estimate the PV generation at the next time step t. Note that $(m_t, n_t)$ is converted from t. However, this may not work unless the weather condition at t is exactly the average of the daily condition in the historical data.

For this reason, our method includes another component that models the variations of the PV generations. We include this component in our predictor because the PV generation varies volatilely with many factors including, but not limited to, the geolocations of the PV device, the irradiance level in the extraterrestrial atmosphere due to the sun's changing zenith angle, and the internal physical and external conditions of the semiconductor materials, such as the temperature coefficient of the silicon, converter delay coefficient, the wind chilling effect, etc.

An Auto Regression model AR(p), or $p^{th}$-order autoregressive model, uses the values at the previous p steps for predicting in a time series. We assume that the PV generations follow an AR(1) model. According to this assumption, the current data in the time series describe sufficiently well the state of the underlying stochastic process, and there is no hidden state that has to be inferred from the historical data. The AR(1) predicts the next PV output in the time series using a linear combination of PV generation at the previous time step. A similar method is double exponential Holt-Winters smoothing that reuses the previous values by dynamically revising the level, trends and seasonality in the time series.

Our method is based on the realization that the time series of PV generations is neither stationary nor homoscedastic. A time series is stationary when its mean is constant over time, whereas it is homoscedastic when its variance is constant over time. Hence, the expected PV generations are different for different time steps. If these expected generations follow a periodic pattern, then we have a seasonal autoregressive model of order one, i.e., SAR(1).

In the SAR(1), the predicted PV output $\hat{x}_t$ is the sum of the expected mean $\mu_t$ for time t, and the observed deviation $(x_{t-1} - \mu_{t-1})$ from the mean $\mu_{t-1}$ at the previous step:

$$\hat{x}_t = \mu_t + \rho \times (x_{t-1} - \mu_{t-1}) \quad (7)$$

The importance of the observed deviation is weighted by a regression coefficient $\rho$, whose determination is described below.

In the 2D case, the time index t can be converted to indices in, and $n_t$. Therefore, the predictor $\hat{x}_t(m_t,n_t)$ is the sum of the historic mean and a regression item, i.e., $$\hat{x}_t(m_t,n_t) = \mu_t(m_t,n_t) + \rho \times (x_{t-1}(m_{t-1},n_{t-1}) - \mu_{t-1}(m_{t-1},n_{t-1})). \quad (8)$$

The regression coefficient $\rho$ regulates the importance of the deviation for the previous moment in time relative to the current PV generation. The larger this coefficient, the more persistent the deviation from the mean is expected to be forward in time.

The physical meaning of the model, when predicting irradiance values (and therefore the PV output), is that if irradiance is, for example, smaller than the average value at the current time, perhaps because the sky is cloudy, this negative deviation is likely to persist in the next time step, e.g., in an hour, because the same atmospheric conditions that caused the deviation are likely to persist at that time. Intuitively, this type of persistence matches the time scale of the main atmospheric processes and the PV generations.

The regression coefficient $\rho$ is determined by a least square method. In the context of the time series of PV output, the least square method is formulated as follows. Recall that we have a time series $x_{1:T'}$ and the means $\mu(m_t,n_t)$. We can obtain a residual series $y_t$ as follows $$\{y_t = x_t - \mu(m_t,n_t) | t=1 \ldots T'\}.$$

We assume that the residual series $y_t$ is linearly correlated, i.e., $y_{t+1} = \rho y_t$. The method determines the coefficient $\rho$ so that the sum of squared residual $\Sigma_{t=1}^{T'}(y_t-\rho y_{t-1})^2$ is minimized. The optimal coefficient $$\rho = \left(\frac{1}{T-1}\sum_{t=1}^{T'} x_t^2\right)^{-1} \times \frac{1}{T-1}\sum_{t=1}^{T'-1} x_t x_{t+1},$$

is used by our model.

Our method predicts the PV output at the current step using a persistent component $\mu_t$ and a variation component $\rho \times (x_{t-1} - \mu_{t-1})$. In our method, the persistent component is represented by the approximate Fourier series, while the variation component is correlated to the deviation at the previous time step.

Our method differs from a prior art method that predicts the overall daily solar irradiance by analyzing a historical data set collected from various geographical regions. In that method, the irradiance series are neither stationary nor homoscedastic. That method represents the series by three components: a mean whose periodic component can be described by the Fourier series with only first-order coefficient, a variance about the mean whose periodic component can be described by the Fourier series with only first two order coefficients, and a stochastic variational component.

Our method does not assume the regularity in the periodicity of the mean and variance of the series of the PV generations because we are predicting the PV output, a task that has more complications than Modeling the solar irradiance at a particular geographical location. One major difference is that predicting PV generations need to consider the complex interactions between solar irradiance and the PV devices, while modeling solar irradiance does not.

Rather, we assume that the time series can be approximated by the Fourier series in a general sense. In addition, our method assumes that the variational component from the previous time step is regulated by a regression coefficient based on a relatively long duration, while the prior art method assumes that it is regulated by the irradiance variance at one single time step.

In our method, the means $\mu(m_t,n_t)$ and the regression coefficient $\rho$ evolve over time. For this reason, given a predicting time t, the mean $\mu(m_t,n_t)$ and $\rho$ can be recalibrated by using the historic data immediately prior to the time t. As the statistics are adapted to the most recent data, our predictor is accurate along time.

Effect of the Invention

Solar generators convert solar energy to electrical power using the photovoltaic (PV) effect. Because the energy generated by the PV device is clean and reusable, the PV energy penetration can be significantly increased.

However, the volatile and intermittent nature of the PV energy device can have operational outage risks unless the volatility and intermittency can be properly managed. One important means to reduce the intermittent effect is to provide methods of accurately predicting the output of the PV device.

The predicted results are essential in managing the operation costs and loss-of-load risks in PV energy generation, storage, transmission, and distribution.

The method predicts the output of the PV device based on daily and annual patterns that are influenced by solar irradiance levels. The method combines Fourier and autoregression analysis based on historical data.

The method is entirely data driven based, and does not rely on movement of the sun, external atmospheric conditions, other unpredictable external parameters, or internal device parameters.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for predicting an output of a photovoltaic (PV) device, comprising the steps of:
   aligning data in two dimensions according to days in a year, and hours in a day;
   applying a two-dimensional Fourier analysis to the data to obtain frequencies and a mean of the frequencies in the data, wherein the data are time series of a historical outputs of the PV device;
   applying regression analysis to the data to obtain a regression coefficient; and
   predicting the PV output at a time step by summing the mean at the time step and a deviation from the mean at a previous time step, wherein the means are approximated by selected frequencies, and wherein the deviation for the previous time step is weighted by the regression coefficient, and wherein the steps of the method are performed in a processor of a control module generating a control strategy for operating the PV device.

2. The method of claim 1, wherein the Fourier analysis explicitly accounts for daily and annual variations of the PV output in the data.

3. The method of claim 1, further comprising:
   selecting the frequencies using spectrum analysis to determine the frequencies that contribute to the output of the PV device.

4. The method of claim 1, wherein the data are aligned as $$\begin{bmatrix} x^{(1)} \\ x^{(2)} \\ \ldots \\ x^{(I)} \end{bmatrix} = \begin{bmatrix} x_1 & x_2 & \ldots & x_{MN} \\ x_{MN+1} & x_{MN+2} & \ldots & x_{2MN} \\ \ldots & \ldots & \ldots & \ldots \\ x_{(I-1)MN+1} & x_{(I-1)MN+2} & \ldots & x_{IMN} \end{bmatrix}$$

in a matrix form, where M indicates a number of days in a year, N a number of hours in the day, and I is the number of years that is spanned by the data.

5. The method of claim 1, wherein the predicted output for the next time step t is $$\hat{x}_t(m_t,n_t) = \mu_t(m_t,n_t) + \rho \times (x_{t-1}(m_{t-1},n_{t-1}) - \mu_{t-1}(m_{t-1},n_{t-1})),$$

where $m_t$ represents a day in a year, and $n_t$ represents an hour in the day, $\mu_t$ is the mean represented by an approximate Fourier series, and $\rho$ is the regression coefficient.

6. The method of claim 3, wherein a predetermined number of the frequencies with a largest amplitudes are selected.

7. The method of claim 3, wherein a predetermined number of the frequencies are selected adaptively.

8. The method of claim 1, wherein the regression coefficient regulates a deviation for the previous time step.

9. The method of claim 1, wherein the regression coefficient is determined by a least square method.

10. The method of claim 1, wherein the predicted output of the PV device for the current time step using a persistent component $\mu_t$ as the mean, and a variational component as $\rho \times (x_{t-1} - \mu_{t-1})$ from the previous time step where $\rho$ is the regression coefficient.

11. The method of claim 1, further comprising:
aligning the data in two dimensions according to a first time scale and a second time scale.

12. The method of claim 1, wherein the time step is now or in the future.

13. A method for predicting an output of a photovoltaic (PV) device, comprising the steps of:
applying Fourier analysis to data to obtain frequencies and a mean of the frequencies in the data, wherein the data are time series of a historical outputs of the PV device, wherein the data are aligned as $$\begin{bmatrix} x^{(1)} \\ x^{(2)} \\ \ldots \\ x^{(I)} \end{bmatrix} = \begin{bmatrix} x_1 & x_2 & \ldots & x_{MN} \\ x_{MN+1} & x_{MN+2} & \ldots & x_{2MN} \\ \ldots & \ldots & \ldots & \ldots \\ x_{(I-1)MN+1} & x_{(I-1)MN+2} & \ldots & x_{IMN} \end{bmatrix}$$

in a matrix form, where M indicates a number of days in a year, N a number of hours in the day, and I is the number of years that is spanned by the data;
applying regression analysis to the data to obtain a regression coefficient; and
predicting the PV output at a time step by summing the mean at the time step and a deviation from the mean at a previous time step, wherein the means are approximated by selected frequencies, and wherein the deviation for the previous time step is weighted by the regression coefficient, and wherein the steps of the method are performed in a processor of a control module generating a control strategy for operating the PV device.

14. A controller for predicting an output of a photovoltaic (PV) device and generating a control strategy for operating the PV device, the controller comprising a processor for
applying Fourier analysis to data to obtain frequencies and a mean of the frequencies in the data, wherein the data are time series of a historical outputs of the PV device;
applying regression analysis to the data to obtain a regression coefficient; and
predicting the PV output at a time step by summing the mean at the time step and a deviation from the mean at a previous time step, wherein the means are approximated by selected frequencies, and wherein the deviation for the previous time step is weighted by the regression coefficient, and wherein the predicted output for the next time step t is $$\hat{x}_t(m_t, n_t) = \mu_t(m_t, n_t) + \rho \times (x_{t-1}(m_{t-1}, n_{t-1}) - \mu_{t-1}(m_{t-1}, n_{t-1})),$$

where $m_t$ represents a day in a year, and $n_t$ represents an hour in the day, $\mu_t$ is the mean represented by an approximate Fourier series, and $\rho$ is the regression coefficient.

* * * * *